United States Patent
Bensalah et al.

(10) Patent No.: US 10,196,907 B2
(45) Date of Patent: Feb. 5, 2019

(54) TURBOMACHINE ROTOR BLADE

(71) Applicant: SAFRAN AIRCRAFT ENGINES, Paris (FR)

(72) Inventors: Slim Bensalah, Paris (FR); Arnaud Negri, Montgeron (FR); Sebastien Digard Brou De Cuissart, Paris (FR); Guillaume Klein, Mery sur Oise (FR); Ba-Phuc Tang, Cergy Saint Christophe (FR); David Mathieu, Chelles (FR); Sibylle Doremus, Draveil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 275 days.

(21) Appl. No.: 14/372,841

(22) PCT Filed: Jan. 16, 2013

(86) PCT No.: PCT/FR2013/050096
§ 371 (c)(1),
(2) Date: Jul. 17, 2014

(87) PCT Pub. No.: WO2013/107982
PCT Pub. Date: Jul. 25, 2013

(65) Prior Publication Data
US 2015/0023793 A1 Jan. 22, 2015

(30) Foreign Application Priority Data

Jan. 17, 2012 (FR) .................................... 12 50435
Jun. 14, 2012 (FR) .................................... 12 55586

(51) Int. Cl.
*F01D 5/22* (2006.01)
*F01D 5/28* (2006.01)
*F01D 5/30* (2006.01)

(52) U.S. Cl.
CPC ............... *F01D 5/225* (2013.01); *F01D 5/28* (2013.01); *F01D 5/288* (2013.01); *F01D 5/30* (2013.01); *Y02T 50/673* (2013.01)

(58) Field of Classification Search
CPC . F01D 5/225; F01D 25/06; F01D 5/28; F01D 5/288; F01D 5/30; F01D 11/12; F01D 11/122; F01D 11/127
(Continued)

(56) References Cited

U.S. PATENT DOCUMENTS 5,083,903 A 1/1992 Erdmann
5,660,320 A 8/1997 Hoffmueller et al.
(Continued)

FOREIGN PATENT DOCUMENTS

CA 2483528 A1 * 4/2004 ............. C23C 26/00
EP 1 793 086 A2 6/2007
(Continued)

OTHER PUBLICATIONS

International Search Report dated Mar. 14, 2013 in PCT/FR13/050096 filed Jan. 16, 2013.
(Continued)

*Primary Examiner* — Christopher Verdier
(74) *Attorney, Agent, or Firm* — Oblon, McClelland, Maier & Neustadt, L.L.P.

(57) ABSTRACT

A turbomachine rotor blade includes an outer part at its distal end. The outer part includes a platform defining an outside surface of a passage for gas passing through a turbomachine and presenting first and second opposite side edges; and upstream and downstream sealing wipers extending outwards from the platform, each wiper extending between two lateral faces situated respectively at the first and second side (Continued)

edges. The two lateral faces of the upstream or the downstream wiper are covered at least in part in an anti-wear material.

17 Claims, 6 Drawing Sheets

(58) Field of Classification Search
USPC ........ 415/173.4, 173.5, 173.6; 416/190, 191, 416/192, 195
See application file for complete search history.

(56) References Cited

U.S. PATENT DOCUMENTS

| | | | |
|---|---|---|---|
| 6,793,878 | B2 | 9/2004 | Blake et al. |
| 2004/0146404 | A1* | 7/2004 | Chantal ................ F01D 5/225 416/224 |
| 2008/0145207 | A1 | 6/2008 | Mohr et al. |
| 2009/0097979 | A1* | 4/2009 | Erdmann ............... F01D 5/225 416/179 |
| 2009/0123288 | A1 | 5/2009 | Baumans et al. |
| 2009/0202344 | A1 | 8/2009 | Bruce et al. |
| 2011/0293402 | A1* | 12/2011 | Kreiselmaier .......... F01D 5/225 415/116 |
| 2013/0170994 | A1* | 7/2013 | Jones ..................... F01D 5/225 416/189 |

FOREIGN PATENT DOCUMENTS

| | | |
|---|---|---|
| EP | 1 890 008 A2 | 2/2008 |
| EP | 1 936 119 | 6/2008 |
| EP | 2 180 142 A1 | 4/2010 |
| EP | 2 402 559 A1 | 1/2012 |
| FR | 2 923 524 | 5/2009 |
| JP | 2004 150272 | 5/2004 |
| JP | 2006-063837 A | 3/2006 |
| JP | 2009-036203 A | 2/2009 |
| JP | 4305928 B | 5/2009 |
| WO | WO 03/029616 A1 | 4/2003 |

OTHER PUBLICATIONS

Notice of Rejection dated Jan. 10, 2017 in Japanese Patent Application No. 2014-552677 (English Translation).

* cited by examiner

TURBOMACHINE ROTOR BLADE

FIELD OF THE INVENTION

The present description relates to a turbomachine rotor blade.

Such a blade may be fitted to any type of turbomachine whether terrestrial or for aviation, and in particular it may be fitted to an airplane turbojet or to a helicopter turboshaft engine.

STATE OF THE PRIOR ART

In the present description, "upstream" and "downstream" are defined relative to the normal flow direction of gas through the turbomachine (from upstream to downstream).

The terms "turbomachine axis" or "engine axis" designate the axis of rotation of the rotor of the turbomachine. The axial direction corresponds to the direction of the axis of the engine and a radial direction is a direction perpendicular to the axis of the engine and intersecting said axis. Likewise, an axial plane is a plane containing the axis of the engine, and a radial plane is a plane perpendicular to said axis.

Unless otherwise specified, the adjectives "inner" and "outer" are used relative to a radial direction such that an inner portion of an element is closer in a radial direction to the axis of the engine than is an outer portion of the same element.

Typically, a rotor blade of a turbomachine comprises an airfoil extending along a stacking axis of the blade between proximal and distal (i.e. inner and outer) ends of the blade. At its proximal end, the blade includes a root for fastening it to a disk of the rotor of the engine, the disk being common to a plurality of blades. The blades serve to recover force from gas passing through the turbomachine in order to transmit force to the rotor disk. At its distal end, a blade may have a transverse element referred to as an outer part. When a plurality of rotor blades are fastened to a rotor disk, their outer parts are arranged side by side so as to form a circumferential band that serves in particular to define the outside of the flow passage for gas passing through the turbomachine, thereby limiting gas leaks at that location. Rotor blades are generally fabricated with a pre-twist angle. When the blades are assembled, they are assembled while applying force to reduce this pre-twist angle to zero, thereby enabling the outer parts of the blades to come into contact and imparting rigidity to the bladed wheel and limiting vibration.

The stacking axis of a blade is the axis perpendicular to the axis of the turbomachine that passes through the center of gravity of the innermost section of the airfoil of the blade (i.e. the section closest to the axis of the engine).

The airfoil of the blade presents a pressure side face and a suction side face. The pressure and suction sides of the blade are defined correspondingly.

Figure 1:
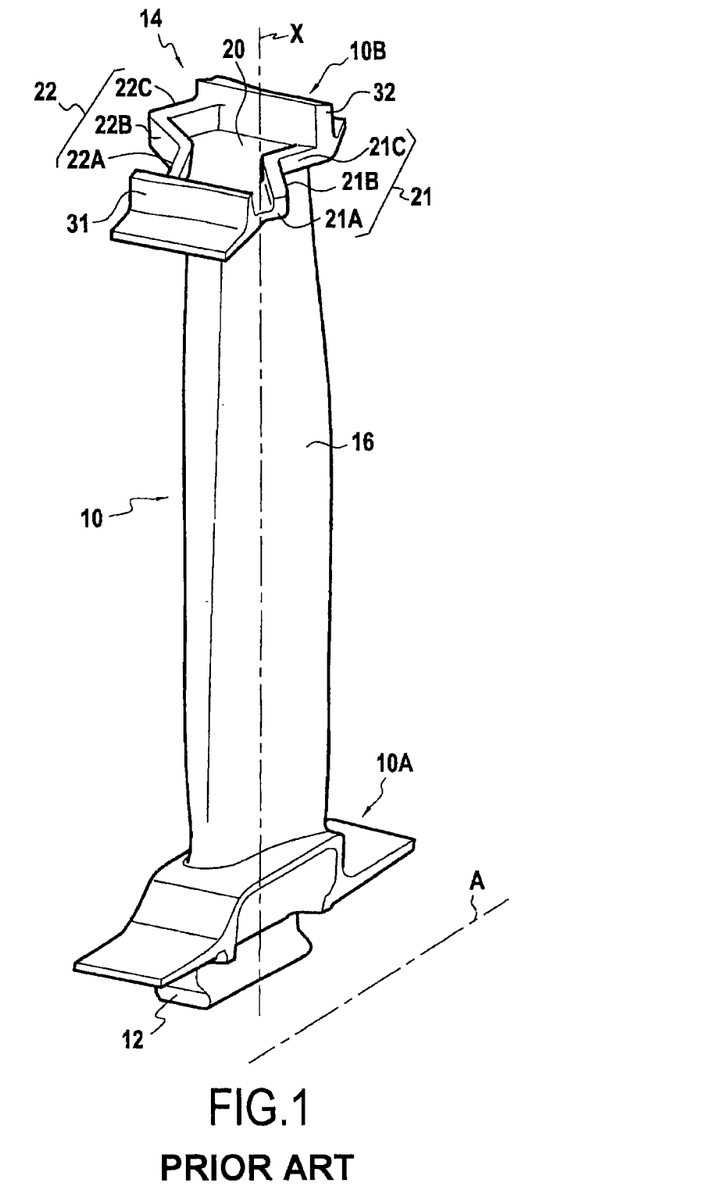
FIG. 1 is a perspective view of a prior art rotor blade.

A conventional rotor blade is shown in FIG. 1. A blade of this type is described in patent document FR 2 923 524 A1. The blade 10 comprises an airfoil 16 extending along the stacking axis X of the blade between the proximal and distal ends 10A and 10B of the blade. The airfoil 16 presents a pressure side face and a suction side face. At its proximal end 10A, the blade has a root 12 whereby it is fastened to a disk of the rotor (not shown). At its distal end 10B, the blade 10 has an outer part 14. When a plurality of rotor blades 10 are fastened to a rotor disk, their outer parts 14 are arranged side by side so as to form a circumferential band.

The outer part 14 comprises: a platform 20 defining the outside of the flow passage for gas passing between the airfoils 16 and presenting first and second opposite side edges 21 and 22 respectively on the pressure side and on the suction side of the blade 10; and upstream and downstream sealing wipers 31 and 32 extending radially outwards from the outside face of the platform 20. Each of the first and second side edges of the platform presents a substantially Z-shaped profile between the upstream and downstream wipers 31 and 32, which profile has a first portion 21A, 22A close to the upstream wiper 31, an intermediate second portion 21B, 22B, and a third portion 21C, 22C close to the downstream wiper 32, the first and third portions being substantially parallel to each other and the second portion extending obliquely between the first and third portions.

In order to damp the vibration to which blades 10 are subjected in operation, the blades are mounted on their rotor disks with pre-stress in twisting about their stacking axes X: the shape of the outer parts 14 is such that each blade 10 is subjected to twisting stress by pressing against the adjacent blades along the second portions 21B, 22B of the side edges 21, 22. The second portions 21B, 22B thus define inter-blade contact surfaces and they are subjected to large amounts of friction while the turbomachine is in operation.

In order to protect them against wear, the second portions 21B, 22B are covered in a material that withstands friction and that is sold under the trademark "Stellite". Conventionally, this anti-wear material is deposited on the second portions 21B, 22B by welding. This is a manual operation and the anti-wear material is in liquid form while it is being deposited.

A first problem encountered with such blades 10 stems from the fact that when the second portions 21B, 22B of the outer part 14 are narrow (i.e. present limited height along the stacking axis X), it is difficult to deposit the anti-wear material on these portions 21B, 22B only (i.e. it is difficult to avoid overflowing from these portions), given that the deposition method used is not sufficiently accurate. Unfortunately, depositing anti-wear material outside the portions 21B, 22B, and in particular on the fillet located between the airfoil 16 and the inside face of the platform 20 is harmful since it may generate cracks in the part and give rise to aerodynamic losses in the gas flow passage.

A solution to that problem consists in "over-dimensioning" the second portions 21B, 22B, i.e. in increasing their height along the stacking axis X. Nevertheless, that solution is not satisfactory since it increases the weight and the size of the outer part 14.

Another problem encountered with such blades 10 is overlapping between adjacent blades (i.e. the side edge 21 of a first blade passes over the side edge 22 of a second blade adjacent to the first), during different stages of operation of the turbomachine.

There therefore exists a need for another type of rotor blade.

SUMMARY OF THE INVENTION

The present description provides a turbomachine rotor blade presenting an outer part at its distal end, the outer part comprising a platform defining the outside surface of the passage for gas passing through the turbomachine and the platform presenting first and second opposite side edges. The outer part also comprises upstream and downstream sealing wipers extending (heightwise) outwards from said platform, each wiper extending (lengthwise) between two lateral faces situated respectively at the first and second side edges. The blade is such that the lateral faces of the upstream or downstream wiper are covered at least in part in an anti-wear material.

In this solution, the lateral faces of the upstream or downstream wiper are configured to carry the anti-wear material and they thus serve as inter-blade contact surfaces.

This solution makes it possible to comply with functional and manufacturing criteria concerning the outer part while also reducing its weight and size (given that in terms of weight the outer part is the most critical portion of the blade). In particular, there is no longer any need to over-dimension the intermediate portions of the side edges since they no longer act as inter-blade contact surfaces. The side edges can therefore be made as narrow as necessary. Furthermore, the new inter-blade contact surfaces make use of the wipers without there being any need to overdimension the wipers.

This solution has the additional advantage of making it easier to position the center of gravity of the outer part of the blade, thereby improving the mechanical behavior of the blade, both in vibration and statically.

In addition, the proposed solution makes it possible to define an inter-blade contact surface of fairly large area, thereby limiting the wear of that surface.

Finally, with this solution, the risk of blades overlapping is reduced because the height of the inter-blade contact surface is increased.

The anti-wear material that is used may be an alloy based on cobalt, and in particular it may be an alloy of the type sold under the trademark "Stellite" that includes a significant content of chromium.

The lateral faces of the upstream or downstream wiper may be covered with the anti-wear material in full or in part. When they are covered in full, the layer of anti-wear material extends heightwise all along the wiper, from the inner face of the platform (i.e. the anti-wear material covers the portion of the side edge that is situated at the base of the wiper, in line with the wiper) up to the outer (i.e. distal) end of the wiper. The presence of anti-wear material at the outer end of the wiper presents the advantage of reinforcing it. When covered in part only, the layer of anti-wear material may, for example, extend heightwise from the inner face of the platform to an outer limit that is spaced back from the outer end of the wiper. Under such circumstances, the outer end portion of the wiper may be made of the same material as the remainder of the outer edge of the wiper. This solution may be advantageous when the anti-wear material does not present the required ties for coming into contact with the abradable material present on the outer casing that surrounds the wiper on its outside. The abradable material is typically a material in honeycomb form, e.g. a metal. The outer edge of the wiper penetrates into the abradable material (which is stationary) in order to provide good sealing in operation.

The anti-wear material may also cover portions of the side edges that are adjacent to the base of the wiper.

Furthermore, using the upstream wiper or the downstream wiper to define the inter-blade contact surfaces makes it possible to optimize the shape of the outer part in terms of weight and size.

In certain embodiments, the wipers are inclined upstream in an axial section plane at a non-zero angle relative to the radial direction. This makes it possible to improve performance while avoiding leaks of air out from the flow passage in operation.

In other embodiments, the wipers are not inclined relative to the radial direction, i.e. in an axial section plane the wipers form an angle that is substantially zero relative to the radial direction: they extend substantially in this direction.

Thus, in certain embodiments of a first type, in which the lateral faces of the upstream wiper are used as inter-blade contact surfaces, and are therefore covered for this purpose in the anti-wear material, it is possible to use the following optimized shape for the platform: each of the first and second side edges presents a profile between the upstream and downstream wipers, which profile is generally U-shaped with a first portion close to the upstream wiper and forming a first branch of the U-shape, an intermediate second portion, forming the base of the U-shape, and a third portion close to the downstream wiper and forming a second branch of the U-shape, the first and third portions diverging.

In certain embodiments of the first type, the above-mentioned second portion extends substantially perpendicularly to the wipers.

In certain embodiments of the first type, the third portion is at least twice as long as the first portion.

In certain embodiments of the first type, the second portion is smaller than the first portion.

In certain embodiments of a second type, in which the lateral faces of the upstream wiper are used as inter-blade contact surfaces and are therefore covered for this purpose in the anti-wear material, it is possible to use the following optimized shape for the platform: each of the first and second side edges presents a profile between the upstream and downstream wipers, which profile has a first portion close to the upstream wiper, an intermediate second portion, and a third portion that is close to the downstream wiper, the first and third portions being substantially parallel to each other and the second portion extending obliquely between the first and third portions from upstream to downstream and from the suction side towards the pressure side of the blade.

This type of profile with three flat portions is sometimes said to be a Z-shaped profile even though the angle formed between the first and second portions is an angle that is obtuse (i.e. not acute) and the angle formed between the second and third portions is likewise an obtuse angle.

With this optimized shape for the outer part, it is easier during fabrication of the blade to position the center of gravity of the outer part correctly relative to the center of gravity of the inner part of the airfoil. It is generally sought to align these two centers of gravity along the radial direction. Positioning the center of gravity of the outer part better relative to the center of gravity of the root part of the airfoil makes it possible to obtain better mechanical behavior of the blade in operation and in particular to improve the ability of the blade to withstand megacyclic fatigue and to withstand creep rupture.

Such an optimized shape presents a particular advantage when the wipers slope upstream. The slope of the wipers raises certain difficulties in aligning the center of gravity of the outer part with that of the inner part of the airfoil.

In certain embodiments of the second type, each of the first and second side edges presents an upstream end portion in line with the first portion and a downstream end portion in line with the third portion.

These upstream and downstream end portions of the side edges laterally define upstream and downstream end portions of the platform, which portions are sometimes referred to as upstream and downstream "lips".

Thus, the side edge of the platform presents a profile with three flat portions that extends from the upstream edge to the downstream edge of the platform, the profile of each side edge thus presenting three flat portions and no more. From a fabrication point of view, such a profile made up of three flat portions is easy to machine, in particular because the number of faces to be machined is limited (only three). This design also makes it possible to limit the weight of the unfinished part, prior to machining, and thus to limit foundry costs. Finally, this design limits the formation of sharp edges and spikes that lead to difficulties when manipulating blades.

In certain embodiments of the second type, the first and third portions extend substantially perpendicularly to the wipers.

In certain embodiments of the second type, the upstream wiper flows upstream at a non-zero angle relative to the radial direction, each of the lateral faces of the upstream wiper joining the side edge of the platform in its intermediate portion. Also, the anti-wear material covers each of the lateral faces of the upstream wiper, at least in part, and covers the intermediate portion of each side edge at least in part, such that the anti-wear material situated on the suction side of the blade is exposed downstream whereas the anti-wear material situated on the pressure side of the blade is exposed upstream.

It should be observed that the exposure direction of the anti-wear material is inverted relative to currently existing solutions. Consequently, the pre-twist angle of the blade is also inverted relative to conventional solutions.

The present solution also provides a turbomachine including a blade as described above.

BRIEF DESCRIPTION OF THE DRAWINGS

The accompanying drawings are diagrammatic and not necessarily to scale, and above all they seek to illustrate the principles of the invention.

In the drawings, from one figure to another, elements (or element portions) that are identical are identified using the same reference signs.

DETAILED DESCRIPTION OF EMBODIMENTS

Embodiments of a rotor blade with an outer part are described in detail below with reference to the accompanying drawings. These embodiments illustrate the characteristics and advantages of the invention. It should nevertheless be recalled that the invention is not limited to these embodiments.

Figure 2:
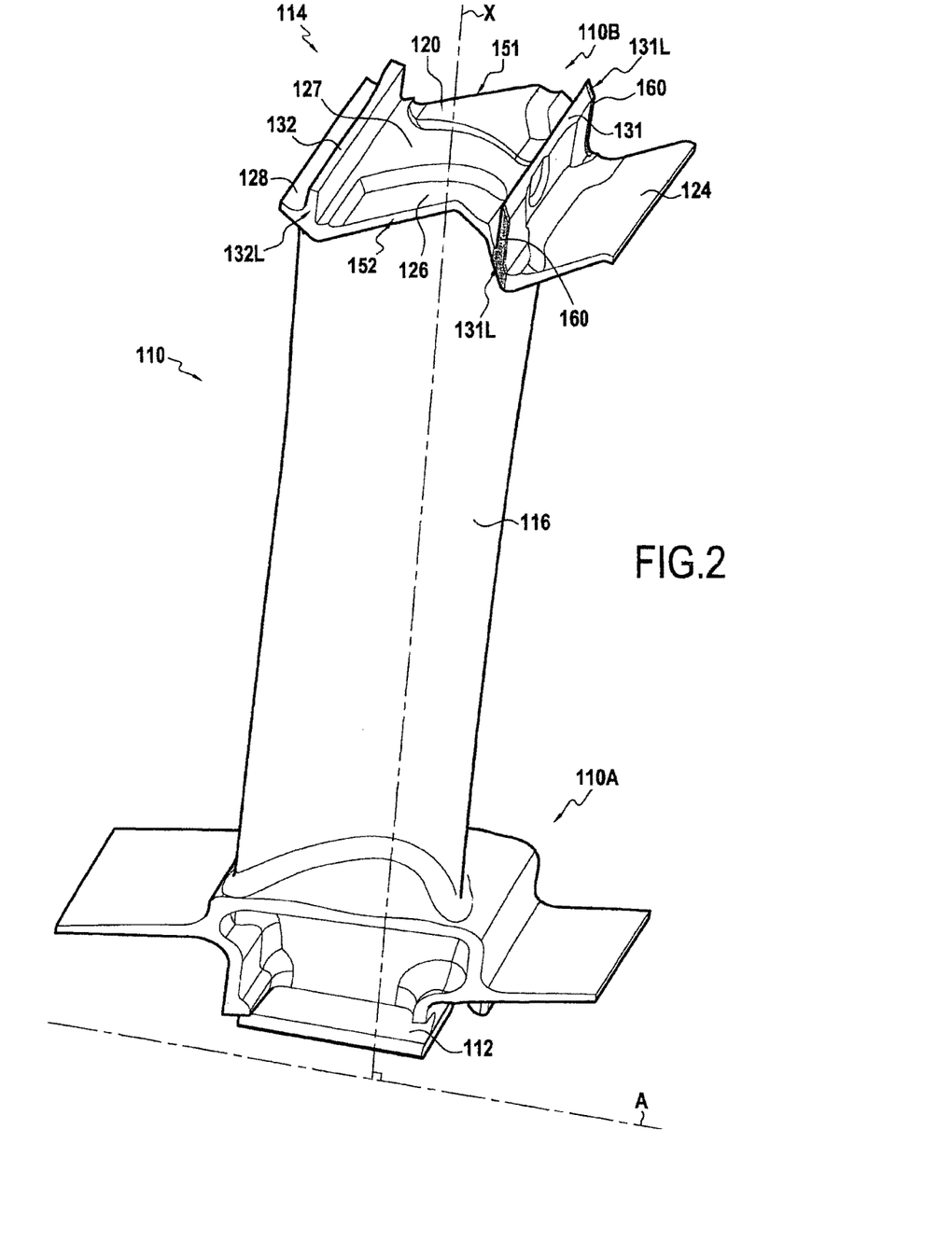
FIG. 2 is a perspective view of an embodiment of a rotor blade of the present description.

FIG. 2 shows an embodiment of a turbomachine rotor blade 110. Such a blade may be used in a low pressure stage of an airplane turbojet.

The rotor blade 110 comprises an airfoil 116 extending along the stacking axis X of the blade between the proximal and distal ends 110A and 110B of the blade (i.e. its inner and outer ends). At its proximal end 110A, the blade has a root 112 whereby it is fastened to a rotor disk (not shown) of a turbomachine (not shown). This disk rotates about the axis A of the engine. At its distal end 110B, the blade 110 has an outer part 114.

When a plurality of rotor blades 110 are fastened to a rotor disk, their outer parts 114 are arranged side by side so as to form a rotary circumferential band defining a surface of revolution around the axis of rotation A of the disk. A particular function of this band is to define the outside surface of the flow passage for the gas passing between the airfoils 116, and thus to limit leaks of gas past the distal ends 110B of the blades 110.

The outer part 114 comprises a platform 120 defining the outside of the flow passage for the gas passing between the airfoils 116, and presenting first and second opposite side edges 151 and 152. The outer part 114 also has upstream and downstream sealing wipers 131 and 132 that extend radially outwards from the platform 120. Each wiper 131 (132) presents two lateral faces 131L (132L) situated respectively at the first and second side edges (151, 152), and each wiper 131 (132) extends circumferentially between its two lateral faces 131L (132L).

When a plurality of rotor blades 110 are fastened on a rotor disk, the upstream and downstream wipers 131 and 132 of the blades are arranged end to end so as to form rotary rings of axis A, each ring being contained substantially in a radial plane. A particular function of such a ring is to limit the clearance that exists between the blades 110 and the covering or casing that surrounds them, in order to limit leaks of gas at this location.

The configuration of the platform 120 is optimized in terms of weight and size.

The platform 120 has an upstream portion 124 referred to as an upstream "lip" that projects upstream from the upstream wiper 131. The platform 120 also has a downstream portion 128 commonly referred to as a downstream "lip", extending downstream from the downstream wiper 132. Finally, the platform presents a central portion 126 extending between the upstream and downstream wipers 131 and 132. In this embodiment, the central portion 126 has a comma-shaped rib 127 that extends from the upstream wiper 131 to the downstream wiper 132 and that is a result of the casting process used for fabricating the blade.

Figure 3:
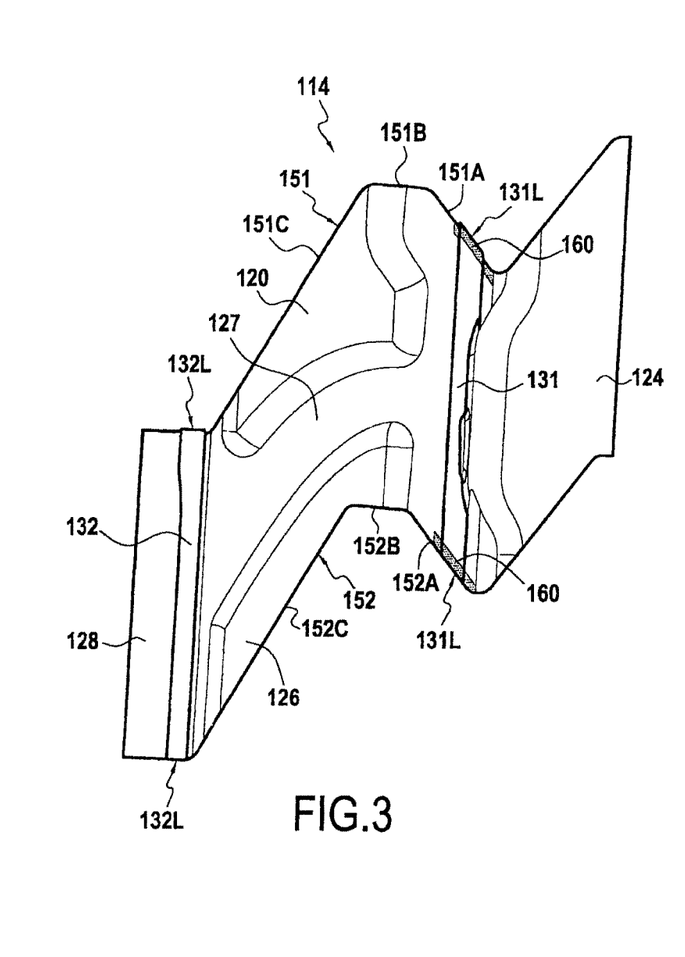
FIG. 3 is a detail view from above of the outer part of the FIG. 2 blade.

As can be seen clearly in FIG. 3, in the central portion 126, each of the first and second side edges 151 (152) of the platform 120 presents a profile that is generally U-shaped, having a first portion 151A (152A) close to the upstream wiper 131 and forming a first branch of the U-shape, a second portion 151B (152B) that is intermediate forming the base of the U-shape, and a third portion 151C (152C) close to the downstream wiper 132 and forming a second branch of the U-shape, the first and third portions 151A, 151C (152A, 152C) being divergent, i.e. these portions 151A, 151C (152A, 152C) spread apart from each other on going away from the second portion 151B (152B). In this embodiment, the second portion 151B (152B) extends substantially perpendicularly to the wipers 131 (132). Nevertheless, it should be observed that the second portion 151B (152B) could have a different slope, or that it could even be omitted. Under such circumstances, the first and third portions 151A, 151C (152A, 152C) would join together and form a V-shape.

The first and second side edges 151 and 152 present complementary shapes, the side edge 151 of a first blade 110 being suitable for being received in the side edge 152 of the blade that is adjacent to said first blade 110. Thus, the first portions 151A, 152A of the side edges 151 and 152 are substantially parallel to each other. The same applies to the second portions 151B, 152B and to the third portions 151C, 152C. Furthermore, the U-shaped profiles of the side edges 151, 152 are such that the branches of the U-shapes point towards the pressure side of the blade 110.

The third portion 151C (152C) of the side edges 151 (152) may be at least twice as large as the first portion 151A (152A). In this embodiment, the third portion 151C (152C) is about three times as long as the first portion 151A (152A). Furthermore, the second portion 151B (152B) may be smaller than the first portion 151A (152A). In this embodiment, this second portion 151B (152B) is about half as long as the first portion 151A (152A). Furthermore, the first and third portions 151A, 151C (152A, 152C) may form between them an angle that lies in the range 15° to 150°, for example. In the embodiment shown, this angle is about 65°.

In order to damp the vibration to which the blades 110 are subjected in operation, the blades 110 are mounted on their rotor disks (not shown) with twist pre-stress about their stacking axes X. Thus, the outer parts 114 are configured so that each blade 110 is subjected to twisting stress by pressing against its neighbors, mainly along the lateral faces 131L of the upstream wipers 131.

The upstream wiper 131 carries a layer of anti-wear material 160 on its lateral faces 131L, which layer is obtained by building up each of these lateral faces 131L with a cobalt-based alloy that presents good anti-wear ties, e.g. such as an alloy of the type sold under the trademark "Stellite". This anti-wear material 160 is represented by shading in the figures.

Figure 4:
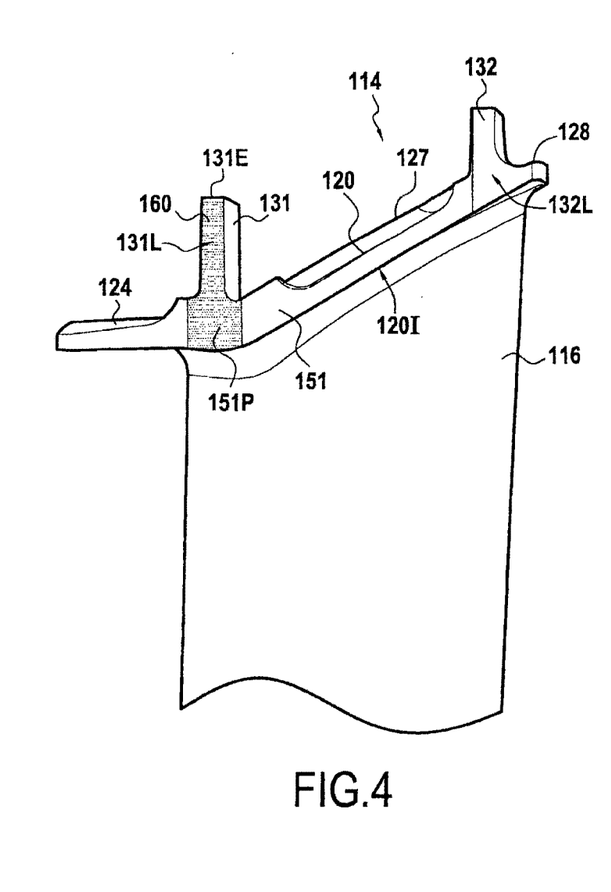
FIG. 4 is a detail view from the side of the outer part of the FIG. 2 blade.

As can be seen clearly in FIG. 4, the layer of anti-wear material 160 extends radially along the wiper 131 from the inside face 1201 of the platform 120 to the outer end 131E of the wiper. Each lateral face 131L of the upstream wiper 131 is thus covered from bottom to top in the anti-wear material 160, and the anti-wear material 160 also covers a portion 151P of the side edge 151 that is adjacent to the base of the wiper. This portion 151P comprises the edge portion situated radially in line with the wiper and may also include edge portions adjacent thereto, as in the configuration shown.

Figure 5:
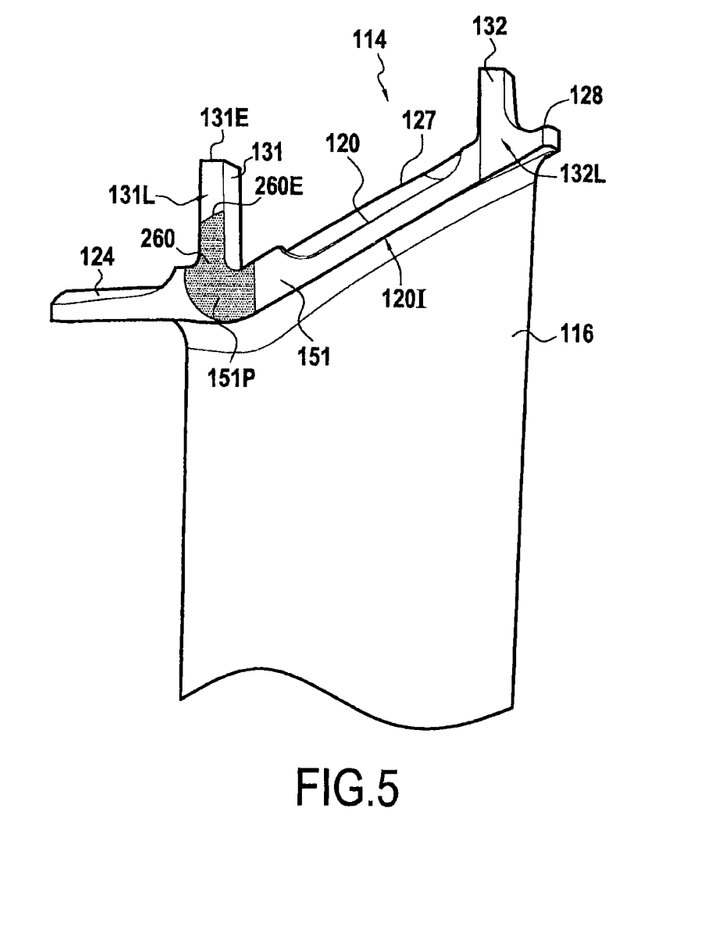
FIG. 5 is a view analogous to the view of FIG. 4, showing another embodiment of a rotor blade of the present description.

In another embodiment, as shown in FIG. 5, each lateral face 131L of the upstream wiper 131, or only one of these lateral faces 131L (the other face 131L then being covered from bottom to top as in the examples of FIGS. 2 to 4), is covered in part only by the anti-wear material 260. More precisely, only the bottom portion of the lateral face 131L is covered. The layer of anti-wear material 260 extends radially along the wiper 131 from the bottom face 1201 of the platform 120 out to an outer limit 260E that is spaced apart from the outer end 131E of the wiper. For example, the outer limit 260E is spaced apart from the outer end 131E of the wiper by 2 millimeters (mm) to 3 mm. The outer portion of the lateral face 131L is thus not covered in anti-wear material, and thus the outer edge of the wiper can be made entirely out of a single material (i.e. the material of the blade). The anti-wear material 260 also covers a portion 151B of the side edge 151 that is adjacent to the base of the wiper. In comparison with the example of FIGS. 2 to 4, this portion 151P extends further downstream towards the downstream wiper 132.

In the example of FIG. 5, the face 131L that carries the layer of material 260 may be locally enlarged (i.e. its axial thickness may be increased) compared with the remainder of the wiper 131 in order to maximize the contact area between blades.

Figure 6:
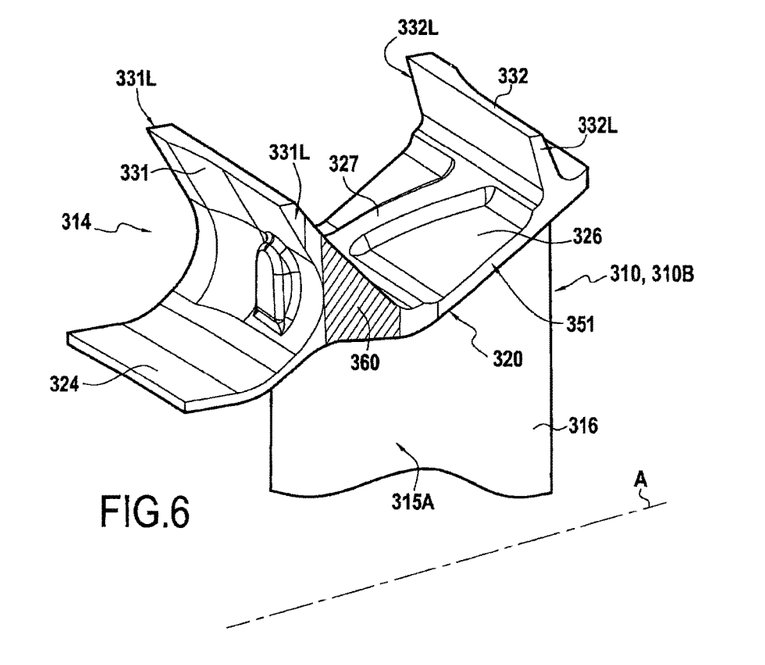
FIG. 6 is a perspective view of another embodiment of a rotor blade of the present description, with only the outer portion of the blade being shown.

FIG. 6 shows an embodiment of a turbomachine rotor blade 310. Such a blade may be used in a low pressure stage of an airplane turbojet.

Only the outer (distal) portion 310B of the blade 310 is shown in FIG. 6. The inner (proximal) portion of the blade 310 may be analogous to that of the blade in FIG. 1.

The rotor blade 310 has an airfoil 316 extending along the stacking axis of the blade between the proximal (i.e. inner) end and the distal (i.e. outer) end 310B of the blade. The airfoil 316 presents a pressure side face 315A and a suction side face (not shown in FIG. 6). At its proximal end (not shown), the blade 310 has a root whereby it is fastened to a rotor disk (not shown) of a turbomachine (not shown). The disk rotates about the axis A of the engine. At its distal end 310B, the blade 310 has an outer part 314.

When a plurality of rotor blades 310 are fastened on a rotor disk, their outer parts 314 are arranged side by side in such a manner as to form a rotary circumferential band defining a surface of revolution around the axis of rotation A of the disk. A particular function of the band is to define the outside surface of the flow passage for gas passing between the airfoils 316 so as to limit leaks of gas past the distal ends 310B of the blades 310.

Figure 8:
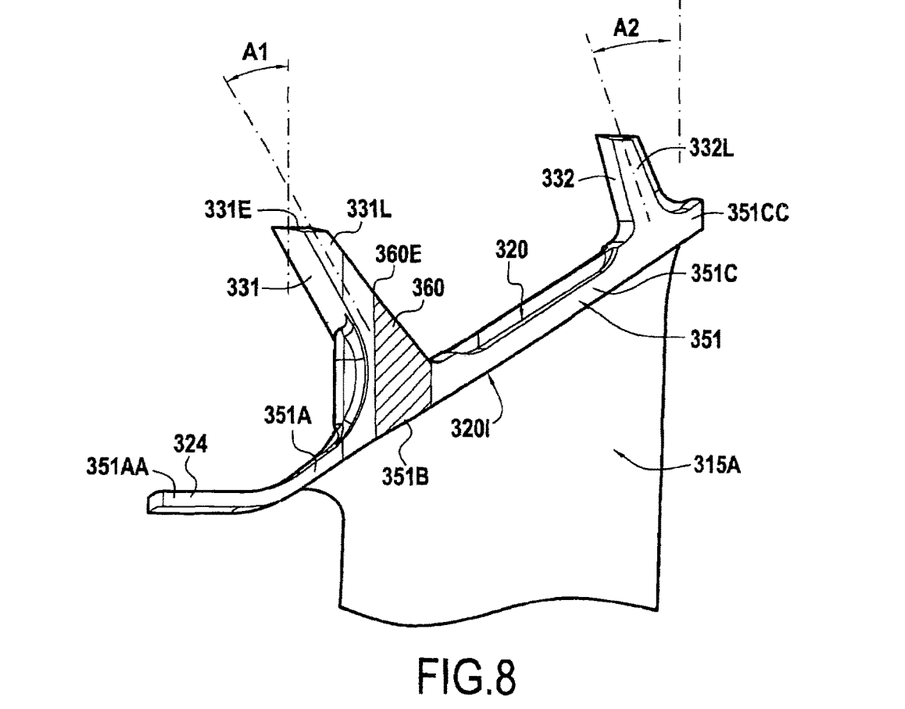
FIG. 8 is a detail view from the side of the outer part of the FIG. 6 blade.

The outer part 314 comprises a platform 320 defining the outside of the flow passage for gas passing between the airfoils 316, and presenting first and second opposite side edges 351, 352 situated respectively on the pressure side and on the suction side of the blade 310. The outer part 314 also has upstream and downstream sealing wipers 331 and 332 extending upwards from the platform 320 in an outward direction. In this embodiment, the wipers 331, 332 are inclined upstream relative to the radial direction by respective non-zero angles A1 and A2. The angles A1 and A2 are shown in FIG. 8, these angles being measured respectively in axial section planes passing via the lateral faces 331L and 332L of the wipers 331, 332.

Each wiper 331 (332) presents two lateral faces 331L (332L) situated respectively at the first and second side edges (351, 352). One of the lateral faces 331L (332L) of the wiper 331 (332) is thus situated on the pressure side of the blade 310, and the other lateral face is situated on the suction side. Each wiper 331 (332) thus extends lengthwise from the pressure side towards the suction side (i.e. in a circumferential direction) between its two lateral faces 331L (332L).

When a plurality of rotor blades 310 are fastened on a rotor disk, the upstream or downstream wipers 331 or 332 of the blades are arranged end to end so as to form respective rotary rings of axis A, each ring being contained substantially in a radial plane. Such a ring serves in particular to limit the clearance that exists between the blades 310 and the cover or casing that surrounds them, in order to limit leaks of gas at that location.

The configuration of the platform 320 is optimized in terms of weight and size.

The platform 320 presents an upstream end portion 324 referred to as the upstream "lip" that extends upstream from the upstream wiper 331. The platform 320 also presents a downstream end portion 328 referred to as the downstream "lip" that extends downstream from the downstream wiper 332. Finally, the platform presents a central portion 326 extending between the upstream and downstream wipers 331 and 332. In this embodiment, the central portion 326 has a comma-shaped rib 327 that extends from the upstream wiper 331 to the downstream wiper 332 and that is a result of the casting process used for fabricating the blade 310.

Figure 7:
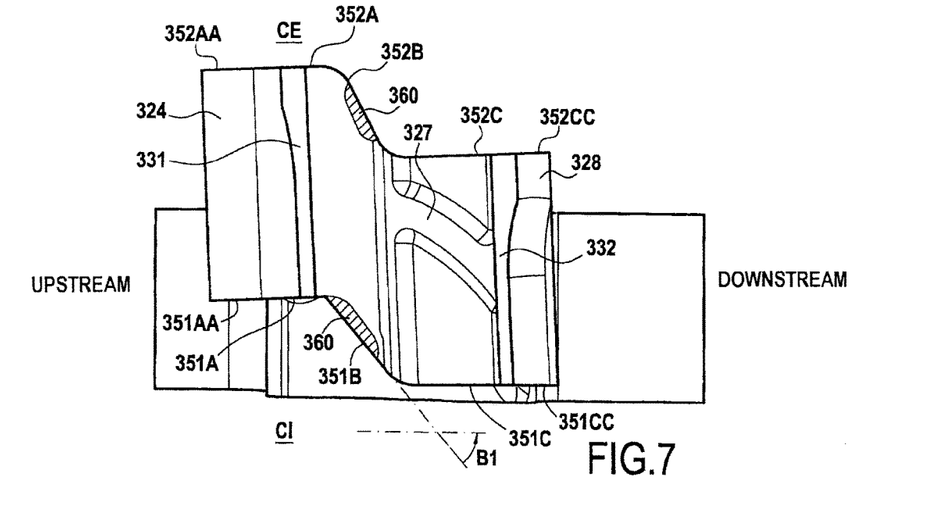
FIG. 7 is a detail view from above of the outer part of the FIG. 6 blade.

As can be seen clearly in FIG. 7, in the central portion 326, each of the first and second side edges 351 (352) of the platform 320 presents a profile having three flat portions with a first portion 351A (352A) close to the upstream wiper 331, an intermediate second portion 351B (352B), and a third portion 351C (352C) that is close to the downstream wiper 332. The second portion 351B (352B) extends obliquely between the first and third portions, from upstream to downstream and from the suction side CE towards the pressure side CI of the blade (see FIG. 7). Thus, in plan view, in the plane of the central portion 326 of the platform 320, the directed angle B1 (see FIG. 7) between the second portion 351B (352B) and the axial direction (i.e. the upstream-downstream direction) lies strictly between 0 to +90°, and is preferably greater than +50°.

In this embodiment, the first and third portions 351A, 351C (352A, 352C) are substantially parallel with each other and oriented in the axial direction. They are substantially perpendicular to the wipers 331 and 332, respectively.

In addition, the first and second lateral edges 351, 352 present respective upstream end portions 351AA, 352AA in alignment with the first portion 351A, 352A, and respective downstream end portions 351CC, 352CC in alignment with the third portion 351C, 352C. The upstream end portions 351AA of the edges 351, 352 laterally define the upstream lip 324, while the downstream end portions 351CC, 352CC of the edges 351, 352 laterally define the downstream lip 328.

The first and second side edges 351 and 352 are complementary in shape, the side edge 351 of a first blade 310 being suitable for engaging in the side edge 352 of the blade adjacent to the first blade 310. Thus, the first portions 351A, 352A of the side edges 351 and 352 are substantially parallel to each other. The same applies to the second portions 351B, 352B and to the third portions 351C, 352C.

In order to damp the vibration to which the blades 310 are subjected in operation, the blades 310 are mounted on their rotor disks (not shown) with twist pre-stress about their stacking axes. The outer parts 314 are configured so that each blade 310 is put under twist pre-stress by bearing against its neighbors, mainly along the lateral faces 331L of the upstream wiper 331.

Thus, an upstream wiper 331 carries a layer of anti-wear material 360 on its lateral faces 331L, which layer is obtained by building out said lateral face 331L with a cobalt-based alloy presenting good anti-wear ties, such as for example an alloy of the type sold under the trademark "Stellite". This anti-wear material 360 is represented by shading in the figures.

In the example, the upstream wiper 331 flares (i.e. its axial thickness increases) on approaching the platform 320, such that the lateral face 331L of the wiper flares as it comes up to the side edge 351 of the platform 320, as shown in FIG. 8. The lateral face 331L joins the side edge 351 of the platform at its intermediate portion 351B (see FIGS. 6 to 8).

As shown in FIG. 8, the layer of anti-wear material 360 extends upwards along the wiper 331 from the inner face 320I of the platform 320 to an outer limit 360E. In this embodiment, the outer limit 360E is spaced apart from the outer end 331E of the wiper. The anti-wear material thus covers only an inner zone of the lateral face 331L. The anti-wear material 360 also covers a zone of the identical portion 351B of the side edge 351, this zone being adjacent to the base of the wiper 331.

In this embodiment, the layer of anti-wear material 360 extends from the base of the wiper 331 towards the outer limit 360E in a direction that is substantially radial, even though the wiper 331 slopes relative to the radial direction. The anti-wear material 360 thus covers only a portion of the lateral face 331L.

As shown in FIG. 7, the anti-wear material 360 situated beside the suction side CE of the blade is exposed downstream whereas the anti-wear material 360 situated beside the pressure side CI of the blade is exposed upstream. The direction in which the anti-wear material is exposed is thus inverted compared with conventional solutions.

Figure 9:
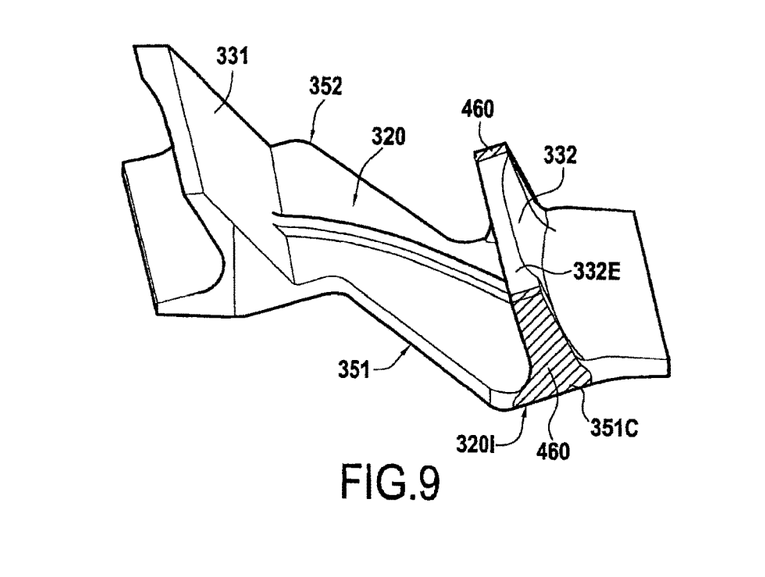
FIG. 9 is a view analogous to FIG. 6, showing another embodiment of a rotor blade of the present description.

Another embodiment is shown in FIG. 9, this embodiment differing from that of FIGS. 6 to 8 essentially by the positioning of the anti-wear material 460, while the general shape of the platform 320, of the wipers 331, 332, and of the side edges 351, 352 is analogous in both embodiments.

In the embodiment of FIG. 9, the layer of anti-wear material 460 extends along the downstream wiper 332. In addition, the anti-wear material 460 extends from the inner face 320I of the platform 320 to the outer end 332E of the wiper. Each lateral face 332L of the downstream wiper 332 is thus completely covered in anti-wear material 460. The anti-wear material 460 also covers the zone of the third portion 351C (352C) of the side edge 351 (352) that is adjacent to the base of the wiper 332.

In general, the anti-wear material may be deposited in various ways. For example, the anti-wear material may be in the form of plates (made of a specific alloy presenting high hardness) that are brazed onto the lateral faces of the wipers. In another technique, the surface that is to be protected is progressively built up with an anti-wear material that is melted together with the top layer of the substrate. The heat needed for deposition is delivered by means of a suitable heat source, such as for example an electric arc sheathed in an inert gas, or indeed a laser beam.

Furthermore, in certain methods, the anti-wear material is deposited on the substrate (i.e. the body of the blade) after locally removing material from the substrate by grinding to a determined depth. In other methods, when fabricating the outer part (e.g. by casting), the zones of the substrate that are to be covered in the anti-wear material are "under-dimensioned" relative to the desired final shape. Thereafter, the anti-wear material is deposited on these zones and the covered zones are then machined in order to obtain the desired final shape.

The embodiments described in the present description are given by way of non-limiting illustration, and in the light of the present description, a person skilled in the art can easily modify these embodiments or can envisage others while remaining within the scope of the invention.

Furthermore, the various characteristics of these embodiments may be used singly or in combination with one another. When they are combined, these characteristics may be combined as described above or in other ways, the invention not being limited to the specific combinations described in the present description. In particular, unless there is a major technical incompatibility, any of the characteristics described with respect to any of the embodiments may be applied in analogous manner to any other embodiment.

The invention claimed is:

1. A turbomachine rotor blade comprising:
   an outer part at its distal end, the outer part including:
      a platform defining an outside surface of a passage for gas passing through a turbomachine and presenting first and second opposite side edges; and upstream and downstream sealing wipers extending outwards from said platform, each wiper extending between two lateral faces situated respectively at the first and second side edges, wherein the two lateral faces of the upstream or the downstream wiper are covered, at least in part, in an anti-wear material, and wherein at least one of the two lateral faces is covered in part in the anti-wear material, such that only an inner zone, in a radial direction, of said at least one of the two lateral faces is covered.

2. A blade according to claim 1, wherein each of the first and second side edges presents a profile between the upstream and downstream wipers, which profile has a first portion close to the upstream wiper, a second portion that is an intermediate portion, and a third portion that is close to the downstream wiper, the first and third portions being substantially parallel to each other and the second portion extending obliquely between the first and third portions from upstream to downstream and from a suction side towards a pressure side of the blade.

3. A blade according to claim 2, wherein each of the first and second side edges presents an upstream end portion in line with the first portion and a downstream end portion in line with the third portion.

4. A blade according to claim 2, wherein the first and third portions extend substantially perpendicularly to the wipers.

5. A blade according to claim 2, wherein the upstream wiper slopes upstream at a non-zero angle relative to the radial direction, each of the two lateral faces of the upstream wiper joining the side edge of the platform in the intermediate portion, and wherein the anti-wear material covers each of the two lateral faces of the upstream wiper, at least in part, and covers the intermediate portion of each side edge at least in part, such that the anti-wear material situated on the suction side of the blade is exposed downstream whereas the anti-wear material situated on the pressure side of the blade is exposed upstream.

6. A blade according to claim 1, wherein one of the two lateral faces is completely covered in the anti-wear material.

7. A blade according to claim 1, wherein the two lateral faces of the upstream wiper are covered in the anti-wear material.

8. A blade according to claim 1, wherein the upstream and/or downstream wiper slopes upstream in an axial section plane at a non-zero angle relative to the radial direction.

9. A blade according to claim 1, in which the upstream and/or downstream wiper extends substantially in the radial direction.

10. A blade according to claim 1, wherein the anti-wear material extends heightwise from an inner face of the platform.

11. A blade according to claim 1, wherein the two lateral faces of the upstream or the downstream wiper that are covered, at least in part, in the anti-wear material are inter-blade contact surfaces.

12. A blade according to claim 1, wherein each of the first and second side edges presents a profile between the upstream and downstream wipers, which profile is generally U-shaped with a first portion close to the upstream wiper and forming a first branch of the U-shape, a second portion that is an intermediate portion and forming a base of the U-shape, and a third portion close to the downstream wiper and forming a second branch of the U-shape, the first and third portions diverging.

13. A blade according to claim 12, wherein the second portion extends substantially perpendicularly to the wipers.

14. A blade according to claim 12, wherein the third portion is at least twice as long as the first portion.

15. A turbomachine including a blade according to claim 1.

16. A blade according to claim 1, wherein each of the first and second side edges presents a profile between the upstream and downstream wipers, which profile has a first portion close to the upstream wiper, a second portion that is an intermediate portion, and a third portion that is close to the downstream wiper, the first and third portions being substantially parallel to each other and the second portion extending obliquely between the first and third portions from upstream to downstream and from a suction side towards a pressure side of the blade.

17. A blade according to claim 16, wherein the upstream wiper slopes upstream at a non-zero angle relative to the radial direction, each of the two lateral faces of the upstream wiper joining the side edge of the platform in the its intermediate portion, and wherein the anti-wear material covers the intermediate portion of each side edge at least in part, such that the anti-wear material situated on the suction side of the blade is exposed downstream whereas the anti-wear material situated on the pressure side of the blade is exposed upstream.

* * * * *